(12) United States Patent
Saily et al.

(10) Patent No.: US 10,735,957 B2
(45) Date of Patent: Aug. 4, 2020

(54) CONTEXT PREPARATION

(71) Applicant: NOKIA SOLUTIONS AND NETWORKS OY, Espoo (FI)

(72) Inventors: Mikko Saily, Laukkoski (FI); Sofonias Hailu, Espoo (FI); Seppo Ilmari Vesterinen, Kuopio (FI)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/070,189

(22) PCT Filed: Feb. 12, 2016

(86) PCT No.: PCT/EP2016/053002
§ 371 (c)(1),
(2) Date: Jul. 13, 2018

(87) PCT Pub. No.: WO2017/121496
PCT Pub. Date: Jul. 20, 2017

(65) Prior Publication Data
US 2019/0014471 A1 Jan. 10, 2019

(30) Foreign Application Priority Data
Jan. 15, 2016 (WO) ................. PCT/EP2016/050708

(51) Int. Cl.
H04W 76/27 (2018.01)
H04W 12/06 (2009.01)
(Continued)

(52) U.S. Cl.
CPC .......... *H04W 12/06* (2013.01); *H04L 9/0891* (2013.01); *H04W 12/04* (2013.01); *H04W 36/0033* (2013.01); *H04W 76/27* (2018.02)

(58) Field of Classification Search
CPC ..... H04W 12/06; H04W 12/04; H04W 76/27; H04W 36/0033; H04W 76/046;
(Continued)

(56) References Cited

U.S. PATENT DOCUMENTS

2009/0279502 A1  11/2009  Zheng et al.
2010/0128694 A1   5/2010  Choi-Grogan
(Continued)

FOREIGN PATENT DOCUMENTS

EP   2498566 A2   9/2012
EP   2592865 A1   5/2013
(Continued)

OTHER PUBLICATIONS

International Search Report and Written Opinion for International Application No. PCT/EP2016/053002, dated Oct. 4, 2016 (13 pages).

(Continued)

Primary Examiner — Chuong A Ngo
(74) Attorney, Agent, or Firm — Brake Hughes Bellerman LLP

(57) ABSTRACT

An apparatus suitable for at least to: select a cell in a low activity state, and; in the case the selected cell is the same as a serving cell while carrying out a state change to the low activity state, transmit a radio connection resume request to the selected cell; or in the case the selected cell is another cell than the serving cell while carrying out a state change to the low activity state, transmit a radio resume request to the selected cell with information on the location of the user device provided the information on the location has not been transmitted in relation to a cell change carried out in the low activity state; receive, as a response to the radio connection
(Continued)

Figure 1:
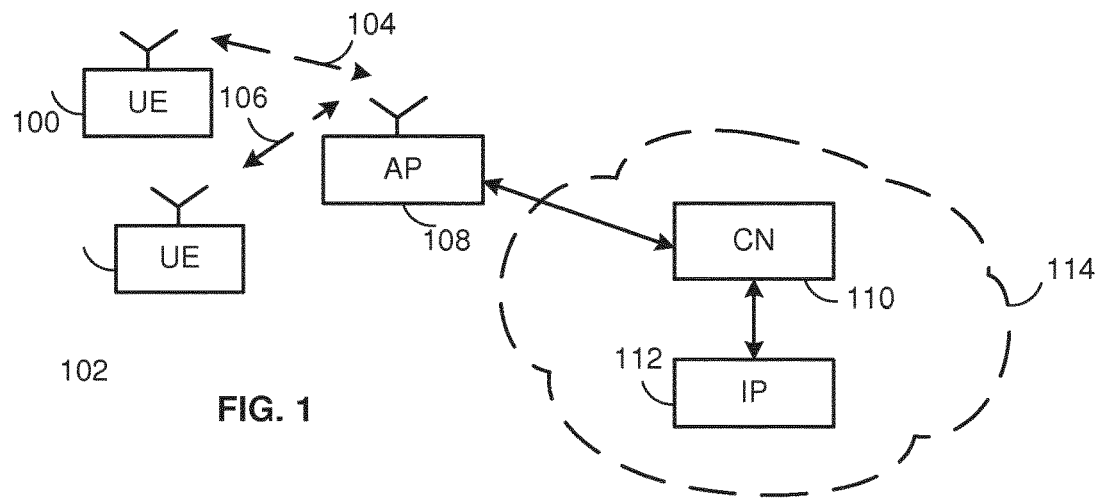

resume request, a radio connection resume request response, and carry out a radio connection resume for the data transmission.

12 Claims, 7 Drawing Sheets

(51) Int. Cl.
    *H04W 36/00* (2009.01)
    *H04L 9/08* (2006.01)
    *H04W 12/04* (2009.01)
(58) Field of Classification Search
    CPC ......... H04W 36/0038; H04W 36/0044; H04W 76/06; H04W 76/04; H04L 9/0891
    See application file for complete search history.

(56) References Cited

U.S. PATENT DOCUMENTS

| | | | |
|---|---|---|---|
| 2012/0276913 A1 | 11/2012 | Lim et al. | |
| 2018/0343659 A1* | 11/2018 | Hahn | H04W 72/085 |

FOREIGN PATENT DOCUMENTS

| | | |
|---|---|---|
| JP | 2015504632 A | 2/2015 |
| WO | 2009135931 A1 | 11/2009 |
| WO | 2011100570 A1 | 8/2011 |
| WO | 2012068304 A1 | 5/2012 |
| WO | 2014013846 A1 | 1/2014 |
| WO | 2014067567 A1 | 5/2014 |
| WO | 2017121485 A1 | 7/2017 |

OTHER PUBLICATIONS

NGMN Alliance, 5G White Paper, Version 1.0, Next Generation Mobile Networks, Feb. 17, 2015 (125 pages).
3GPP TR 25.912 V12.0.0 (Sep. 2014); 3rd Generation Partnership Project; Technical Specification Group Radio Access Network; Feasibility study for evolved Universal Terrestrial Radio Access (UTRA) and Universal Terrestrial Radio Access Network (UTRAN) (Release 12); Valbonne, France, Sep. 2014 (64 pages).
SA WG2 Meeting #111, S2-153694, "User plane based solution with AS information stored in RAN", Ericsson, Alcatel Lucent, Oct. 19-23, 2015, Chengdu, P.R. China (9 pages).
Office Action for Japanese Patent Application No. 2018-536881, dated Jul. 8, 2019, 4 pages.
3GPP TSG-RAN WG2 NB-IOT Ad-hoc Meeting; R2-160508; "Discussion on the Unique eNB ID for NB-IOT UP Solution"; 5.1.2; ETRI; Budapest, Hungary, Jan. 19-21, 2016; 5 pages.
3GPP TSG-RAN2 WG2 NB-IOT Ad-hoc Meeting; R2-160515; "Re-use of RRC Connection Re-establishment Procedure for RRC Resume Signalling"; 5.1.2; BlackBerry UK Limited; Budapest, Hungary, Jan. 19-21, 2016; 7 pages.

* cited by examiner

CONTEXT PREPARATION

CROSS-REFERENCE TO RELATED APPLICATIONS

This application is a national stage entry of PCT Application No. PCT/EP2016/053002 filed Feb. 12, 2016, entitled "CONTEXT PREPARATION" which claims the benefit of priority of PCT/EP2016/050708 filed Jan. 15, 2016, both of which are hereby incorporated by reference in their entireties.

FIELD

The invention relates to communications.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

In the future, mobile communications systems will not be used for human interaction alone. Instead, a huge growth in machine type communications, sometimes referred to as the 'Internet of Things', is expected. The devices will also not only be remotely controlled and managed by people, but will communicate with one another as well. Therefore one target in developing communications systems is to provide a radio interface which will not be the bottleneck even for the most challenging use cases. Another target is security, not only for protecting sensitive personal data, but also for providing safety from inserting false information to the system.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: receive, by a network node, a radio connection resume request or a request for preparation of a network context from a user device, the radio connection resume request or the request for the preparation of the network context comprising information on a node operating as a serving node for the user device, and in the case the network node is not the node operating as the serving node, transmit a network context request for a network context information of the user device to the node operating as the serving node and receive the network context information, and transmit a response to the radio connection resume request or to the request for preparation of a network context to the user device, the response to the radio connection resume request or to the request for preparation of a network context comprising information needed for data transmission; or transmit the network context request for the network context information of the user device, receive and store the network context information while the user device is in a low activity state.

According to an aspect of the present invention, there is provided an apparatus comprising: at least one processor and at least one memory including a computer program code, the at least one memory and the computer program code configured to, with the at least one processor, cause the apparatus at least to: receive, by a node storing a network context information of a user device, a radio connection resume request from the user device; verify the user device with authentication information associated with the network context information, and transmit a response to the radio connection resume request to the user device, the response comprising information needed for data transmission; or receive, by the node storing the network context information of the user device, a network context request for the network context information of the user device from a requesting node; verify the user device with the authentication information associated with the network context information, and transmit the network context information to the requesting node the network context information comprising security information for data transmission.

According to an aspect of the present invention, there is provided an apparatus comprising: at least one processor and at least one memory including a computer program code, the at least one memory and the computer program code configured to, with the at least one processor, cause the apparatus at least to: select a cell in a low activity state, and in the case the selected cell is the same as a serving cell while carrying out a state change to the low activity state, transmit a radio connection resume request to the selected cell; or in the case the selected cell is another cell than the serving cell while carrying out a state change to the low activity state, transmit a radio connection resume request to the selected cell with information on the location of the user device provided the information on the location has not been transmitted in relation to a cell change carried out in the low activity state; receive, as a response to the radio connection resume request, a radio connection resume request response, and carry out a radio connection resume for the data transmission.

According to yet another aspect of the present invention, there is provided a method comprising: receiving, by a network node, a radio connection resume request or a request for preparation of a network context from a user device, the radio connection resume request or the request for the preparation of the network context comprising information on a node operating as a serving node for the user device, and in the case the network node is not the node operating as the serving node, transmitting a network context request for a network context information of the user device to the node operating as the serving node and receiving the network context information, and transmitting a response to the radio connection resume request or to the request for preparation of a network context to the user device, the response to the radio connection resume request or to the request for preparation of a network context comprising information needed for data transmission; or transmitting the network context request for the network context information of the user device, receiving and storing the network context information while the user device is in a low activity state.

According to yet another aspect of the present invention, there is provided a method comprising: receiving, by a node storing a network context information of a user device, a radio connection resume request from the user device; verifying the user device with authentication information associated with the network context information, and transmitting a response to the radio connection resume request to the user device, the response comprising information needed for data transmission; or receiving, by the node storing the network context information of the user device, a network context request for the network context information of the user device from a requesting node; verifying the user device with the authentication information associated with the network context information, and transmitting the network context information to the requesting node the network context information comprising security information for data transmission.

According to yet another aspect of the present invention, there is provided a method comprising: selecting a cell in a low activity state, and in the case the selected cell is the same as a serving cell while carrying out a state change to the low activity state, transmitting a radio connection resume request to the selected cell; or in the case the selected cell is another cell than the serving cell while carrying out a state change to the low activity state, transmitting a radio connection resume request to the selected cell with information on the location of the user device provided the information on the location has not been transmitted in relation to a cell change carried out in the low activity state; receiving, as a response to the radio connection resume request, a radio connection resume request response, and carrying out a radio connection resume for the data transmission. According to yet another aspect of the present invention, there is provided an apparatus comprising: means for receiving, by a network node, a radio connection resume request or a request for preparation of a network context from a user device, the radio connection resume request or the request for the preparation of the network context comprising information on a node operating as a serving node for the user device, and in the case the network node is not the node operating as the serving node, means for transmitting a network context request for a network context information of the user device to the node operating as the serving node and means for receiving the network context information, and means for transmitting a response to the radio connection resume request or to the request for preparation of a network context to the user device, the response to the radio connection resume request or to the request for preparation of a network context comprising information needed for data transmission; and/or means for transmitting the network context request for the network context information of the user device, means for receiving and means for storing the network context information while the user device is in a low activity state.

According to yet another aspect of the present invention, there is provided an apparatus comprising: means for receiving, by a network node, a radio connection resume request or a request for preparation of a network context from a user device, the radio connection resume request or the request for the preparation of the network context comprising information on a node operating as a serving node for the user device, and in the case the network node is not the node operating as the serving node, means for transmitting a network context request for a network context information of the user device to the node operating as the serving node and means for receiving the network context information, and means for transmitting a response to the radio connection resume request or to the request for preparation of a network context to the user device, the response to the radio connection resume request or to the request for preparation of a network context comprising information needed for data transmission; and/or means for transmitting the network context request for the network context information of the user device, means for receiving and means for storing the network context information while the user device is in a low activity state.

According to yet another aspect of the present invention, there is provided an apparatus comprising: means for selecting a cell in a low activity state, and, in the case the selected cell is the same as a serving cell while carrying out a state change to the low activity state, means for transmitting a radio connection resume request to the selected cell; or, in the case the selected cell is another cell than the serving cell while carrying out a state change to the low activity state, means for transmitting a radio connection resume request to the selected cell with information on the location of the user device provided the information on the location has not been transmitted in relation to a cell change carried out in the low activity state; means for receiving, as a response to the radio connection resume request, a radio connection resume request response, and means for carrying out a radio connection resume for the data transmission. According to yet another aspect of the present invention, there is provided a computer program, comprising program code portions for controlling executing of a process, the process comprising: receiving, by a network node, a radio connection resume request or a request for preparation of a network context from a user device, the radio connection resume request or the request for the preparation of the network context comprising information on a node operating as a serving node for the user device, and in the case the network node is not the node operating as the serving node, transmitting a network context request for a network context information of the user device to the node operating as the serving node and receiving the network context information, and transmitting a response to the radio connection resume request or to the request for preparation of a network context to the user device, the response to the radio connection resume request or to the request for preparation of a network context comprising information needed for data transmission; or transmitting the network context request for the network context information of the user device, receiving and storing the network context information while the user device is in a low activity state.

According to yet another aspect of the present invention, there is provided a computer program, comprising program code portions for controlling executing of a process, the process comprising: receiving, by a node storing a network context information of a user device, a radio connection resume request from the user device; verifying the user device with authentication information associated with the network context information, and transmitting a response to the radio connection resume request to the user device, the response comprising information needed for data transmission; or receiving, by the node storing the network context information of the user device, a network context request for the network context information of the user device from a requesting node; verifying the user device with the authentication information associated with the network context information, and transmitting the network context information to the requesting node the network context information comprising security information for data transmission.

According to yet another aspect of the present invention, there is provided a computer program, comprising program code portions for controlling executing of a process, the process comprising: selecting a cell in a low activity state, and in the case the selected cell is the same as a serving cell while carrying out a state change to the low activity state, transmitting a radio connection resume request to the selected cell; or in the case the selected cell is another cell than the serving cell while carrying out a state change to the low activity state, transmitting a radio connection resume request to the selected cell with information on the location of the user device provided the information on the location has not been transmitted in relation to a cell change carried out in the low activity state; receiving, as a response to the radio connection resume request, a radio connection resume request response, and carrying out a radio connection resume for the data transmission.

LIST OF DRAWINGS

Figure 2:
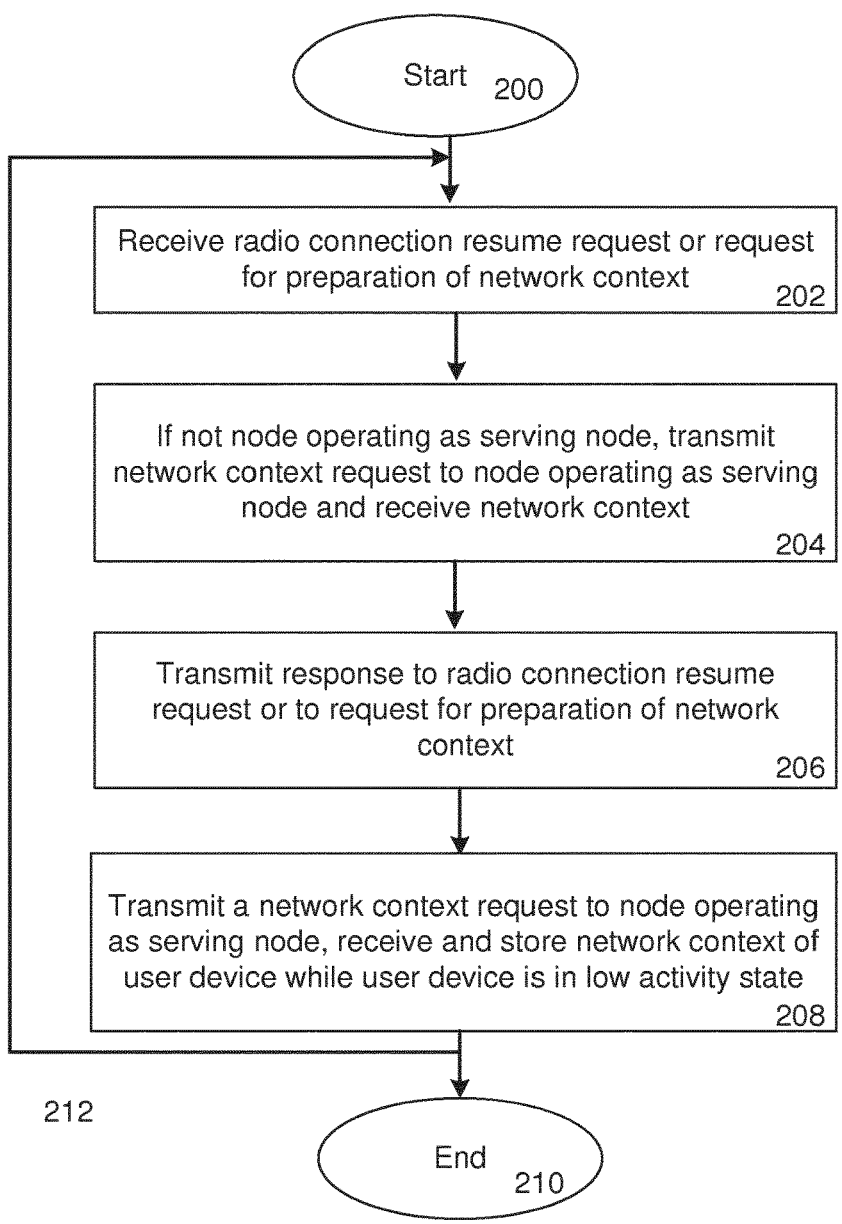
Figure 3:
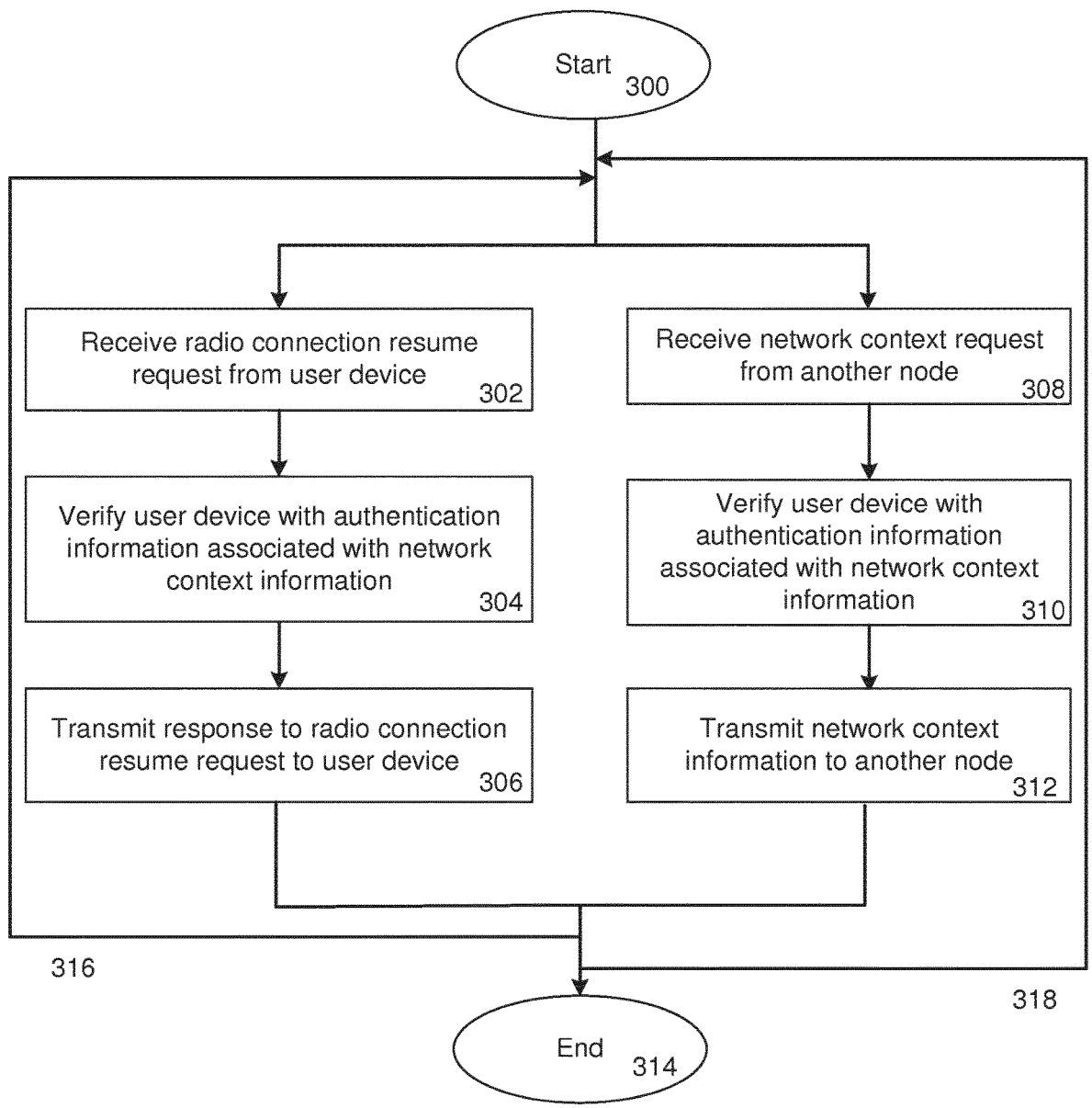
Figure 4:
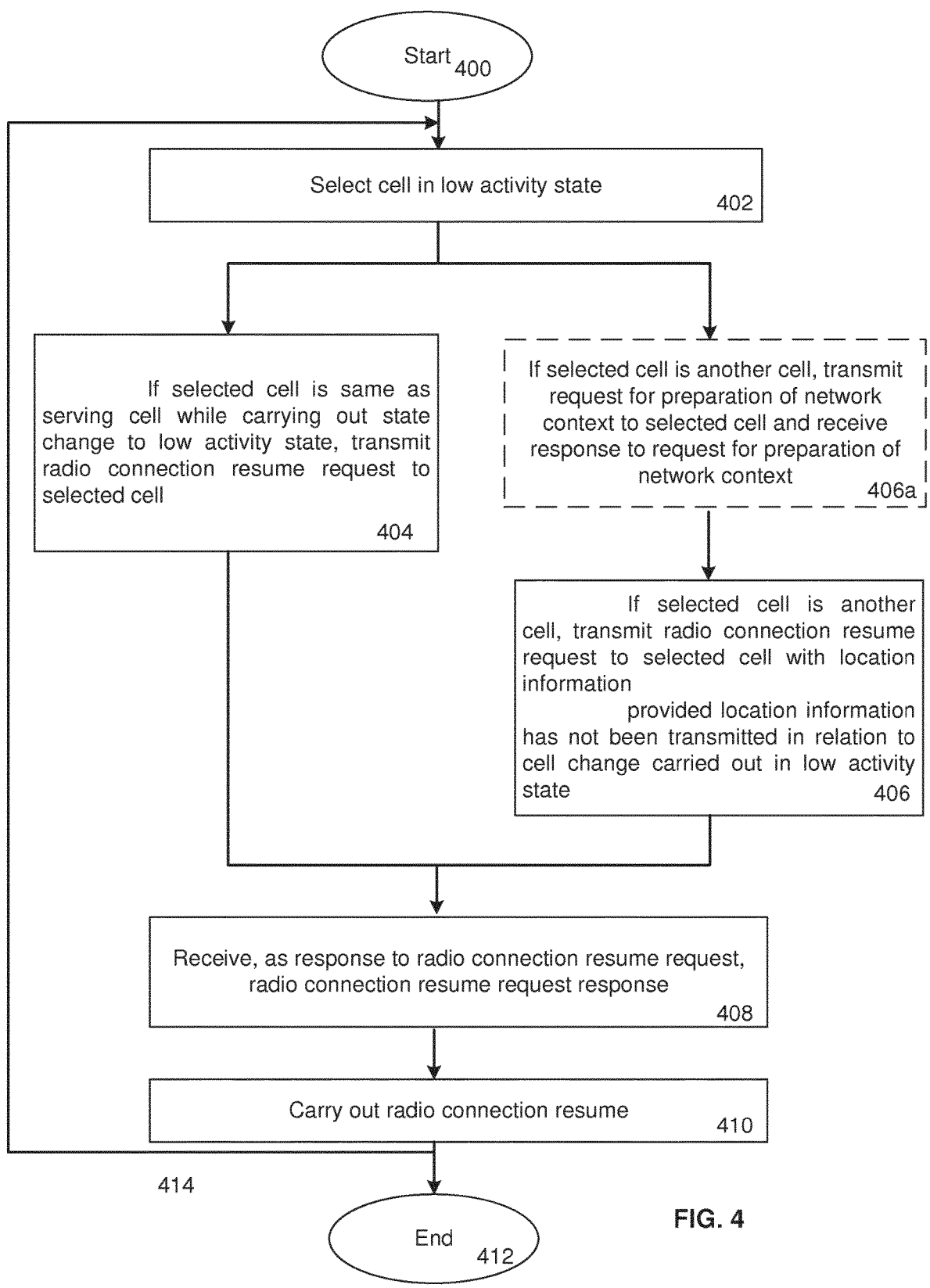
Figure 5A:
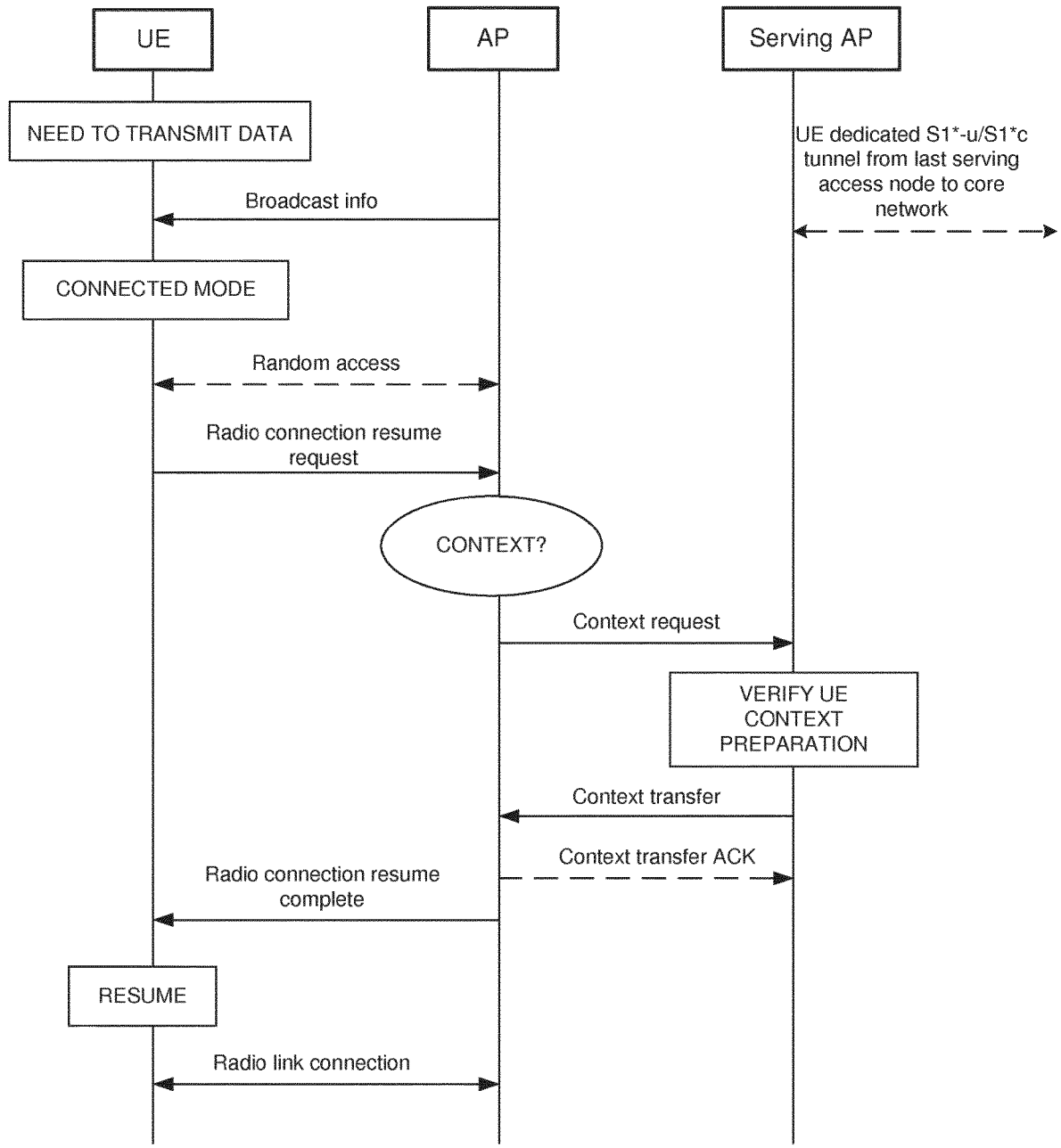
Figure 5B:
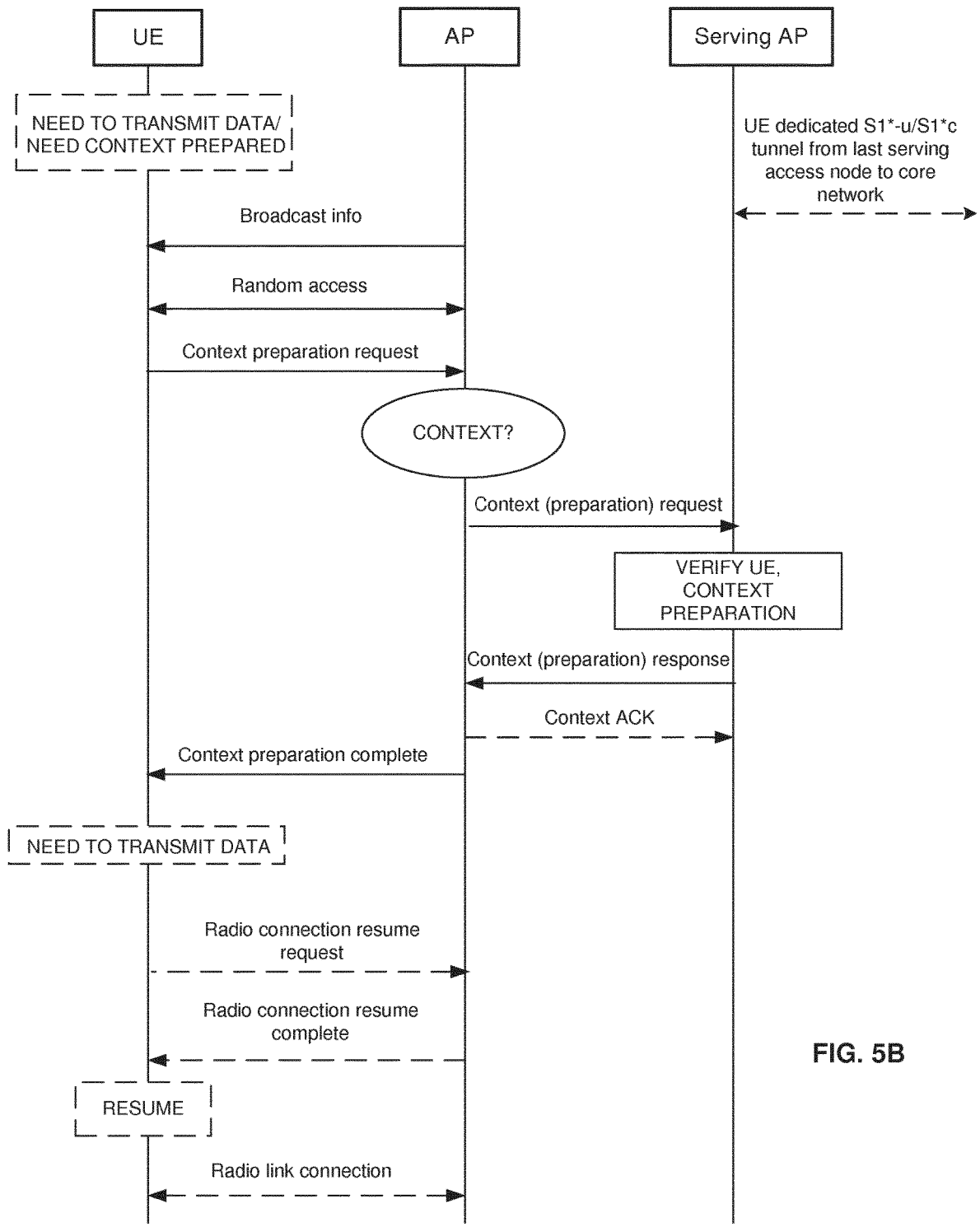
Figure 5C:
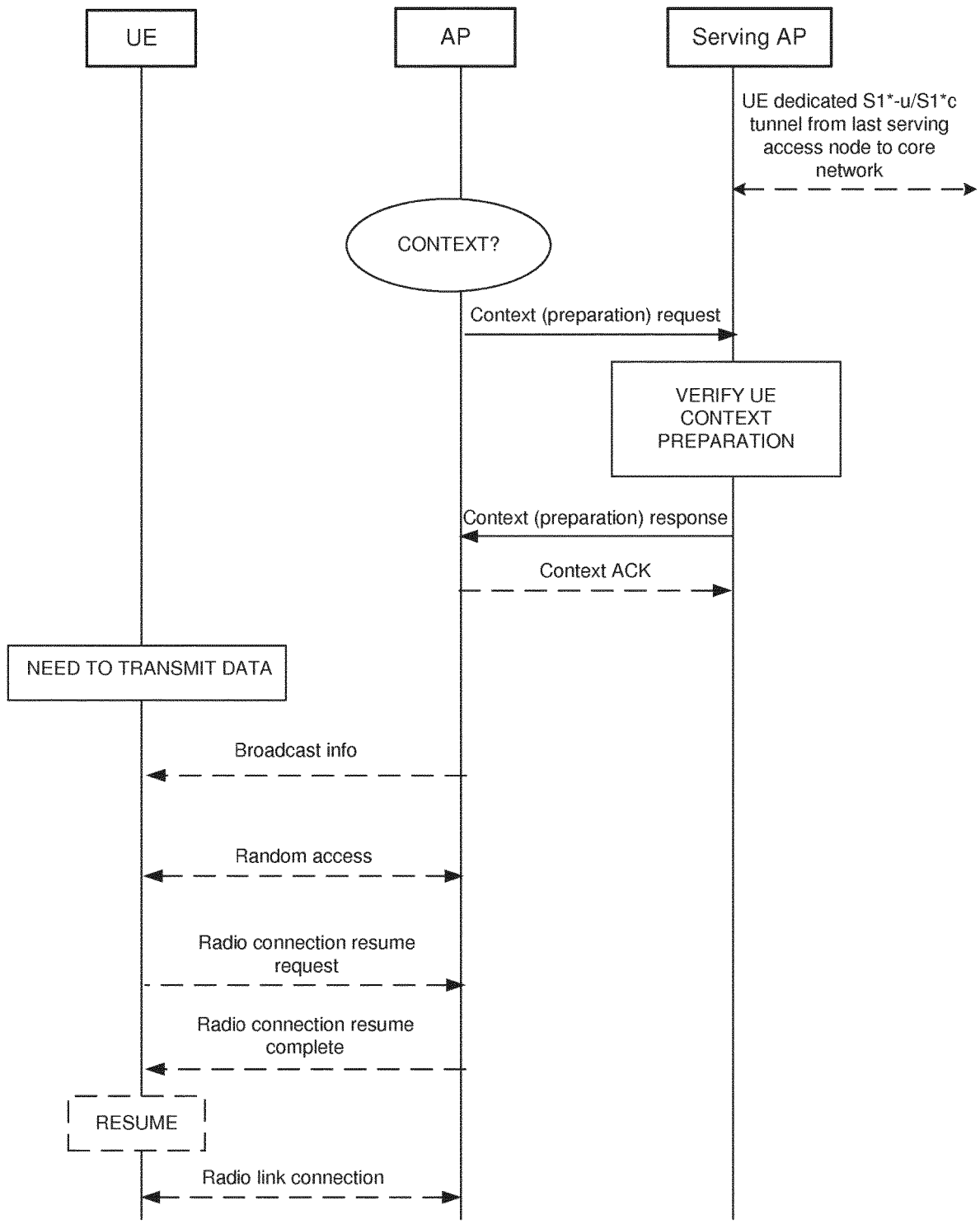
Figure 6:
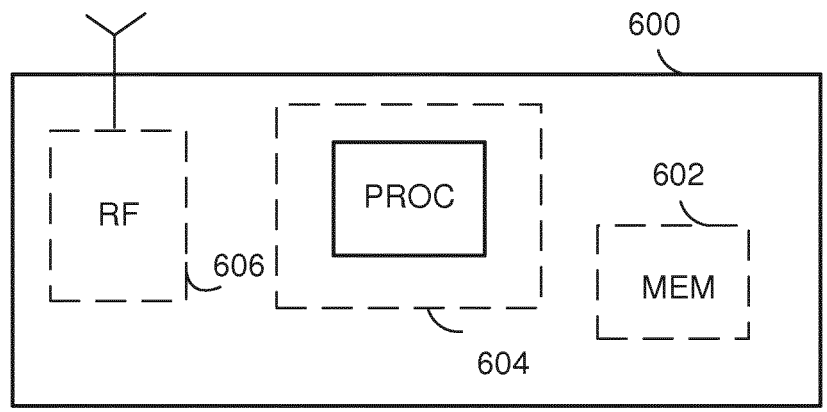
Figure 7:
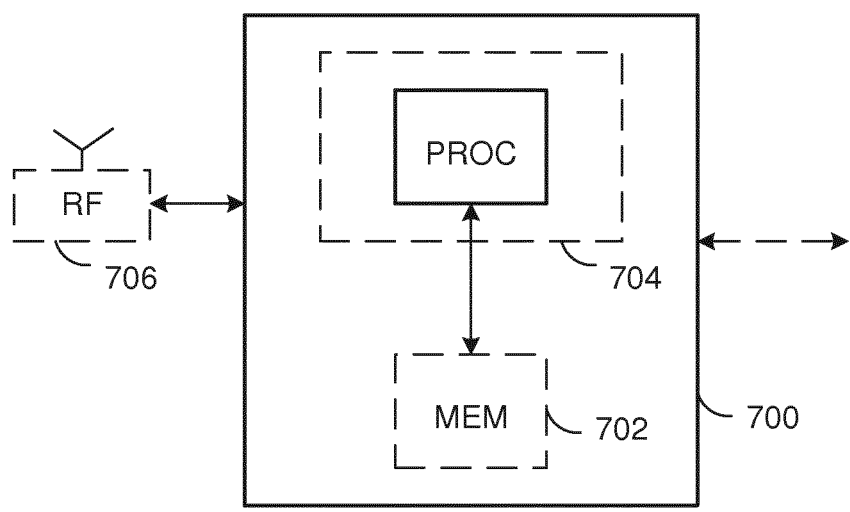

Some embodiments of the present invention are described below, by way of example only, with reference to the accompanying drawings, in which
FIG. 1 illustrates an example of a system;
FIG. 2 is a flow chart;
FIG. 3 is another flow chart;
FIG. 4 is yet another flow chart;
FIGS. 5A-5C are examples of signaling charts;
FIG. 6 illustrates an example of apparatuses, and
FIG. 7 illustrates another example of apparatuses.

DESCRIPTION OF SOME EMBODIMENTS

Some embodiments of the present invention will now be described hereinafter with reference to accompanying drawings. It should be appreciated that the invention may be embodied in many different forms and should not be construed as limited to the embodiments set forth herein.

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are 5G, the universal mobile telecommunications system (UMTS) radio access network (UTRAN or E-UTRAN), long term evolution (LTE, the same as E-UTRA), wireless local area network (WLAN or WiFi), worldwide interoperability for microwave access (Wi-MAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties. Another example of a suitable communications system is the 5G concept. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

The example of FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of LTE Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104 and 106 in a cell with an access node (such as (e)NodeB) 108 providing the cell. The physical link from a user device to a (e)NodeB is called uplink or reverse link and the physical link from the (e)NodeB to the user device is called downlink or forward link. It should be appreciated that the number of nodes may vary, as well as the number of networks.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment.

The (e)NodeB includes or is coupled to transceivers. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services, for example at least part of core network operations may be carried out as a cloud service (this is depicted in FIG. 1 by "cloud" 114). It should be appreciated that (e)NodeBs or their functionalities may be implemented by using any node, host, server or access point etc. entity suitable for such a usage.

The communication system may also comprise a central control entity, or a like, providing facilities for networks of different operators to cooperate for example in spectrum sharing.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

It is obvious for a person skilled in the art that the depicted system is only an example of a part of a radio access system and in practice, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e) Node Bs are required to provide such a network structure.

For fulfilling the need for improving the deployment and performance of communication systems, the concept of "plug-and-play" (e)NodeBs has been introduced. Typically, a network which is able to use "plug-and-play" (e)Node Bs, includes, in addition to Home (e)NodeBs (H(e)nodeBs), a home node B gateway, or HNB-GW (not shown in FIG. 1). A HNB Gateway (HNB-GW), which is typically installed within an operator's network may aggregate traffic from a large number of HNBs back to a core network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

One target in developing communications systems is to provide a radio interface which will not be the bottleneck even for the most challenging use cases. One issue to study is latency which is important for achieving high data rates while keeping equipment cost low, ensuring fast procedure response times in the system (e.g. fast wake up and dormancy, fast link reconfiguration), a whole new range of use cases like remote control of machines and objects in the cloud or tactile Internet. Another target is security, not only for protecting sensitive personal data, but also for providing safety from inserting false information to the system. This is important for example in vehicular safety.

In the following, embodiments suitable for a network connection preparation for a user device are disclosed in further detail. Some embodiments provide an option to enable a radio connection resume with security operations which may additionally be suitable for latency-critical operations.

A low activity state is typically a state, wherein a user device is connected to a radio access network, but it is not active that is to say it is not transmitting or receiving data, for example (inactive but connected in the sense of a radio resource control (RRC) connection). The low activity state may also be an energy saving state, for example when the related service uses machine type communication or the apparatus involved is an Internet of Things apparatus, such as a smart metering device. A low activity state may be the low activity state described in PCT/EP2016/050708 which is taken herein as a reference as to the concept of a low activity state.

A radio connection resume may mean "waking-up" or renewing/restarting a radio connection of a user device when it makes a state change from a low activity state to an active or connected state for data transmission. It should be appreciated that a "suspended" (not released) connection may be resumed, there is not a need to request a new connection (but it is possible). If the connection is suspended, the radio resources configured to this connection may be released and configured for other users, but connectivity on the control and the user plane from an access node (the last serving node in the user devices' active or connected state) to a core network (S1-u/S1-c) is maintained. In the case the radio resource connection is resumed, renewed or restarted, the radio resource connection may be linked to the maintained control and user plane connections by a user identifier which the access node has stored during the low activity period.

It should be appreciated that the coding of software for carrying out the embodiments shown and described below is well within the scope of a person of ordinary skill in the art.

One embodiment starts in block 200 of FIG. 2. This embodiment is suitable for being carried out by a (access) node, host, server or a like which is not storing user device's network context when the user device is in a low activity state. A network context may be an eNB UE context which is a block of information (radio network layer information elements (IEs)) associated to one (active) user device. The block of information comprises information required for maintaining network services to the user device, such as user device state information, security information, capability information and identities of a user device-associated logical S1-connection. The network context may be established when a user devices enters into an RRC connected state or in relation to a handover.

In block 202, a radio connection resume request or a request for preparation of a network context is received from a user. The radio connection resume request or the request for preparation of a network context comprises information on a node operating as a serving node for the user device. A serving node stores user device's network context during the low activity state. The serving node may be the last serving node of the user device while it was in an active or connected state that is to say before entering into a low activity state or the responsibility for storing the network context may be transferred to another node, for example based on a cell change carried out by a user device while it is in a low activity state. Information on a node operating as a serving node for the user device may be an identifier comparable to a user identifier.

A radio connection resume request or a request for preparation of a network context may comprise authentication information, such as a user identifier and an authentication token. The user identifier may be the same as the user identifier used for linking the radio connection to be resumed to the maintained control and user plane connections or it may be a temporary one established for the radio connection resume. The authentication information may be used for verification of the user device. The authentication token may be created (and informed to the user device) by a serving node in relation to the user device entering into the low activity state. Alternatively, the network may send the NCC value to the UE and the UE prepares an authentication token the same or similar to shortMAC, by choosing the right inputs for the token derivation based on the received NCC value. It is also an option to use existing authentication information, if available. Additionally, the radio connection resume request or the request for preparation of a network context may comprise a cause for the request (radio connection resume, network context preparation, location update, etc). Authentication information may be cell-specific, node-specific or tracking-area specific.

It is also an option to combine Information on a node operating as a serving node for the user device, such a node identifier, and a user identifier as a resume identifier. Such a resume identifier may be created such that the network will be able to extract the serving node identifier and/or user identifier from the resume identifier.

In an embodiment, a random access procedure (such as that of the LTE) may be carried out before transmitting a radio connection resume request or a request for preparation of a network context for obtaining radio resources needed for the transmitting. In the random access procedure, a user device may use a ciphering key that has been in use before it entered in a low activity state.

In block 204, in the case the network node is not the node operating as the serving node, a network context request for a network context information of the user device is transmitted to the node operating as the serving node and the network context information is received.

A serving node may be a node storing a network context as described in PCT/EP2016/050708 which is taken herein as a reference in relation to the operations or characters of a serving node.

Authentication information may be forwarded to a serving node as a part of a network context request to be used in user device verification in relation to a network context of the user device. Location information on a user device may also be forwarded to a serving node as a part of the network context request in order the serving node may update user device's location. Additionally, information on a user device's state change to an active or connected state may be conveyed as a part of the network context request.

A received network context may comprise security information for data transmission, for instance for ciphering user data. The security information may be a security context and additionally also a security identifier. The security identifier may be may be the same as the user identifier used for linking the radio connection to be resumed to the maintained control and user plane connections or it may be a special purpose security identifier. The security context may be an evolved packet system (EPS) security context (as in the LTE) which is a state that is established locally at a user device and a serving network node. The EPS security context comprises an EPS non-access stratum (NAS) security context and an EPS access stratum (AS) security context. Another option is an EPS AS security context which comprise cryptographic keys at AS level with their identifiers, a next hop parameter (NH), a next hop chaining counter parameter (NCC) used for next hop access key derivation, identifiers of the selected AS level cryptographic algorithms and counters used for replay protection. The cryptographic keys may refer to the keys that are used for ciphering user data, for example K_UP_enc, and for integrity protection and ciphering of RRC signaling messages between a user device and an access node, such as K_RRC_int and K_RRC_enc. All these keys may be derived from K_eNB. The security information, such as one or more security or ciphering keys or cryptographic algorithms, may be cell-specific, access node specific or tracking area specific, for example. It should be appreciated that cryptographic algorithms etc. may be chosen in a similar manner to that used in the LTE or like.

In one embodiment, a user device may carry out context information preparation in association with different cells and nodes during its mobility in a low activity state. In one example, when the user device selects another cell provided by a serving node than the last serving cell, it may send a request for preparation of a network context associated with the selected cell. The prepared context may include information required for data transmission, e.g., a cell specific intermediate key. The user device may be informed about an NCC parameter value used in the preparation of the cell specific intermediate key. The prepared context may include an authentication token specific to the selected cell. The intermediate key and/or token preparation may be carried out, in a similar manner as in the LTE. If the user device has already a context associated with the selected cell, it may not send the request for preparation of a network context.

In another example, a user device may send a request for preparation of a network context when it selects a cell that is provided by another node than a serving node. The prepared context may include information required for data transmission, e.g. a cell or node specific intermediate key. The user device may be informed about an NCC parameter value used in the preparation of the intermediate key. The prepared context may include an authentication token specific to the selected cell/node. The intermediate key and/or token preparation may be carried out in a similar manner as in the LTE. If the user device has already a context associated with the selected cell, it may not send the request for preparation of a network context.

It should be appreciated that a user device may have multiple network contexts prepared. The number of prepared network contexts may be limited due to memory space requirements in the user device and/or the network. When the user device has data to transmit and a prepared context for the selected cell/node, the prepared context may be used in a radio connection resume. If the prepared context has an authentication token, the user may be verified using this authentication token. Otherwise, the authentication token associated with a serving node is used to verify the user device and the user device verification is carried out by the serving node.

In another embodiment, a serving access node change may be carried in which case the new serving node starts storing the network context of the user device. The serving node change may be carried out between access nodes based on information conveyed in relation to the reception of the network context or by a separate signalling message. Both c- and u-plane connections may be switched in cooperation with a core network to the new serving access node in a similar fashion to that of an inter-node handover. If the serving node is changed, the new serving (access) node may update security information, such as one or more cryptographic algorithm, with signalling with the core network.

In the case a serving node is not changed, security information may be updated without the assistance of the core network. It should be appreciated that cryptographic algorithms, may not change, if the mobility of the user device is restricted to the cells of the serving node during a low activity state. However, if the resume request or context preparation request is sent from a different cell of the serving node than the last serving cell, security keys need typically to be updated if cell-specific security keys are used, for example, as following: the serving node sends an NCC value to the user device for intermediate key K_eNB* derivation. The user device derives a K_eNB* using the (the one used before entering into a low activity state) K_eNB (if the received NCC is same with that the user device has) or NH (if it is different) and perhaps other cell-specific inputs, such as target physical cell identity (PCI), etc, as well.

In block 206, a response to the radio connection resume request or to the request for preparation of a network context is transmitted to the user device. The response comprises information needed for data transmission.

Information needed for data transmission may be new radio resource configuration, if the earlier configured resources are released. It may also comprise security information, typically one or more cryptographic algorithms in the case it has been updated. It should be appreciated that typically, an intermediate key is not transmitted between a node and a user device, instead, a NCC parameter or alike from which the intermediate key may be derived by the user device, may be transmitted. The security information may be transmitted in the response to the request for preparation of a network context as an option to transmitting it in the response to the radio connection resume request. It should be appreciated, though, that the security information may be updated as a part of the radio connection resume, in which case the updated security information may be transmitted as a part of the response to the radio connection resume request.

In block 208, another option is shown. In block 208, the network context request for the network context information of the user device is transmitted and the network context information is received and stored while the user device is in a low activity state.

In this option, a user device is in a low activity state and a node (access node, network node) in the area of which the user device is located, transmits a network context request to a node which served the user device (stores the user device's network context) when the user device entered into the low activity state. The node in the area of which the user device is located is aware of the user device's location based on a location update the user device carries out with regard to a cell change, for example. The location update or location information comprises information on the identity of the node storing the user device's network context for other nodes being able to contact it. The location information may be transmitted or updated as described in PCT/EP2016/050708 (such as informing about a cell change) which is taken herein as a reference in relation to this matter. The node receives the network context and stores it for possible immediate or later use. In this manner the network context (and security information) is ready to be used when the radio connection resumption is completed (if the context transfer from the serving node to the current node is carried out as part of 'radio connection resume request') or when the user device transmits a radio connection resume request to the current node later (if the context transfer from the serving node to the current node is done as part of 'a request for preparation of network context'). The network context may be node-specific or cell-specific It is also possible, for example in the case where there are a plenty of small cells in the area, that one node takes care of the network context preparation for a plurality of nodes in which case the network connection may be tracking area-specific or cell group-specific (for example valid for small cells under the same macro cell). As a response to the receiving of the network context of the user device, a confirmation message may be transmitted to the serving node. The embodiment ends in block 210. The embodiment is repeatable in many ways. An example is shown by arrow 212 in FIG. 2. It should be understood that the embodiment may be repeated one or more times with a constant or variable pause between separate rounds.

Another embodiment starts in block 300 of FIG. 3. This embodiment is suitable for being carried out by a (access) node, host, server or a like which is storing user device's network context when the user device is in a low activity state (may be called a serving node). A network context may be an eNB UE context which is a block of information (radio network layer information elements (IEs)) associated to one (active) user device. The block of information comprises information required for maintaining network services to the user device, such as user device state information, security information, capability information and identities of a user device-associated logical S1-connection. The network context may be established when a user devices enters into an RRC connected state or in relation to a handover.

The serving node may be the last serving node of the user device while it was in an active or connected state that is to say before entering into a low activity state or the responsibility for storing the network context may be transferred to another node, for example based on a cell change carried out by a user device while it is in a low activity state.

In block 302, a radio connection resume request is received from a user device by a node storing the network context information of the user device.

In block 304, the user device is verified with authentication information associated with the network context information. Authentication information may comprise a user identifier and an authentication token. The user identifier may be the same as the user identifier used for linking the radio connection to be resumed to the maintained control and user plane connections or it may be a temporary one established for the radio connection resume. The authentication token may be created (and informed to the user device) by a serving node in relation to the user device entering into the low activity state.

In block 306, a response to the radio connection resume request to the user device is transmitted. The response comprises information needed for data transmission.

Information needed for data transmission may be new radio resource configuration, if the earlier configured resources are released. It may also comprise security information, typically one or more cryptographic algorithms in the case it has been updated. It should be appreciated that typically, a ciphering key is not transmitted between a node and a user device, instead, an intermediate key from which the ciphering key may be derived by the user device, may be transmitted.

Another option starts in block 308, wherein a network context request for the network context information of the user device is received from a requesting node.

A network context request may comprise user identification, authentication information (in the case it is not stored in a serving node which generated it, the procedure may be negotiated or specified in advance), resume cause, identity of the requesting node and/or information on a tracking area. Authentication information may be used in user device verification in relation to a network context of the user device. Location information on a user device may also be forwarded to a serving node as a part of the network context request in order the serving node may update user device's location. Additionally, information on a user device's state change to an active or connected state may be conveyed as a part of the network context request.

In block 310, the user device is verified with the authentication information associated with the network context information.

A requested node may also be configured to operate as a secondary access node for carrier aggregation, multi-link connectivity or as a relaying node, in which case it needs only a part of the user device's network context data and the last serving node operates as a primary access node maintaining a "full" network context data. If the requesting node is configured as a secondary node, security information may be updated independently from a core network.

A node storing a network context may update security information, such as one or more cryptographic algorithm, independently from a core network without signalling with the core network, especially when the security information is usable only in one or more cells provided by the serving (access) node or in a tracking are it defines. Examples of security information are explained in more details above in relation to FIG. 2. PCT/EP2016/050708 is taken herein as a reference in relation to the operations or characters of a serving node or a node storing a network context.

In block 312, the network context information comprising security information for data transmission is transmitted to the requesting node.

Security information comprises typically one or more cryptographic algorithms or security or cryptographic keys. More details on security information and updating the security information are presented above in relation to FIG. 2. The security information is typically cell, node or tracking area specific. Information on S1-u/S1-c connectivity may also be conveyed in this connection.

It is also possible that the duty to store network context information is transferred to a requesting node to make is a new serving node, instead of configuring it as a secondary or assisting node while the original serving node remains a radio access network (RAN) anchor. The serving node change may be carried out between access nodes based on information conveyed in relation to the reception of the network context or by a separate signalling message. Both c- and u-plane connections may be switched in cooperation with a core network to the new serving access node in a similar fashion to that of an inter-node handover. A radio connection resume request (block 302) and/or the network context request (308) may comprise information on the location of the user device to be used in a decision making of a change of a duty to store the network context information of the user device and/or to be stored.

The embodiment ends in block 314. The embodiment is repeatable in many ways. One example is shown by arrow 316 and another one by arrow 318 in FIG. 3. It should be understood that the embodiment may be repeated one or more times with a constant or variable pause between separate rounds.

Yet another embodiment starts in block 400 of FIG. 4. This embodiment is suitable for being carried out by a user device or a like which is in a low activity state and having data to be transmitted (comprising also a need to use a service).

In block 402, a cell is selected in a low activity state.

Typically, a user device selects a suitable cell based on radio measurements made to a broadcast signal each node is transmitting. The quality of a radio channel is an important factor in cell selection. The user device may be configured to carry out radio measurements in a low activity state.

In block 404, in the case the selected cell is the same as a serving cell while carrying out a state change to the low activity state, a radio connection resume request is transmitted to the selected cell.

A radio connection resume request may comprise authentication information, such as a user identifier and an authentication token. The user identifier may be the same as the user identifier used for linking the radio connection to be resumed to the maintained control and user plane connections or it may be a temporary one established for the radio connection resume. The authentication information may be used for verification of the user device. The authentication token may be created (and informed to the user device) by a serving node in relation to the user device entering into the low activity state. The radio connection resume request may also comprise identification of the access node last serving the user device before state change to a low activity state. The user device may have obtained this identification as a part of the signalling in relation to the state change. The radio connection resume request may comprise user identification as well, also a cause for the resume request may be included.

In block 406, in the case the selected cell is another cell than the serving cell while carrying out a state change to the low activity state, a radio connection resume request is transmitted to the selected cell which may include information on the location of the user device.

In block 408, as a response to the radio connection resume request radio connection resume response is received.

A response to a radio connection resume request may comprise a new radio resource configuration, if the earlier configured resources are released. It may also comprise security information which typically comprises one or more cryptographic algorithms or security or cryptographic keys. More details on security information are presented above in relation to FIG. 2. The security information is typically cell, node or tracking area specific. It should be appreciated that typically, an intermediate key is not transmitted between a node and a user device, instead, a NCC parameter or alike from which the intermediate key may be derived by the user device, may be transmitted. In another option (block 406a), in the case the selected cell is another cell than the serving cell while carrying out a state change to the low activity state, prior to transmitting the radio connection resume request to the selected cell a request for preparation of a network context is transmitted to the selected cell, and a response to the request for preparation of a network context is received. The response comprises security information for data transmission. It should be appreciated, though, that the security information may be updated as a part of the radio connection resume, in which case the updated security information may be transmitted as a part of the response to the radio connection resume request. In block 410, a radio connection resume for the data transmission is carried out.

A radio connection resume may mean "waking-up" or renewing/restarting a radio connection of a user device (such as an RRC connection) when it makes a state change from a low activity state to an active or connected state for data transmission. It should be appreciated that a "suspended" (not released) connection may be resumed, there is not a need to request a new connection (but it is possible). If the connection is suspended, the radio resources (such as radio bearers) configured to this connection may be released and configured for other users, but connectivity on the control and the user plane from an access node (the last serving node in the user devices' active or connected state) to a core network (S1-u/S1-c) is maintained. In the case the radio resource connection is resumed, renewed or restarted, the radio resource connection may be linked to the maintained control and user plane connections by a user identifier which the access node has stored during the low activity period. Radio bearers may be resumed or reconfigured in a similar manner to that of the LTE, for example.

The embodiment ends in block 412. The embodiment is repeatable in many ways. One example is shown by arrow 414 in FIG. 4. It should be understood that the embodiment may be repeated one or more times with a constant or variable pause between separate rounds.

In the following, some examples of embodiments described above by means of FIGS. 2 to 4 are presented by means of signalling charts of FIGS. 5A, 5B and 5C. FIG. 5A shows an example, wherein a user device (UE) transmits a radio connection resume request for data transmission.

A user device determines a need for a data transmission and starts listening to broadcast channels of access nodes (one shown, AP) nearby for cell selection. Broadcast info typically comprises public land mobile network (PLMN) identity, tracking area code, cell identity, etc. When the user device finds a suitable cell, it changes its status to a connected state. Typically, a user device selects a suitable cell based on radio measurements made to a broadcast signal each node is transmitting. The quality of a radio channel is an important factor in cell selection. The user device may be configured to carry out radio measurements in a low activity state.

A random access procedure, such as a RACH procedure of the LTE, may be carried out for obtaining resources for transmitting a radio connection resume request (such as an RRC resume request). The user device transmits the radio connection resume request to the selected access node/network node (AP).

If the network node is not the node operating as the serving node, it transmits a network context request to the node operating as the serving node. A serving node stores user device's network context during the low activity state. The serving node may be the last serving node of the user device while it was in an active or connected state that is to say before entering into a low activity state or the responsibility for storing the network context may be transferred to another node, for example based on a cell change carried out by a user device while it is in a low activity state. The serving node verifies the user device with authentication information associated with the network context. Authentication information may comprise a user identifier and an authentication token. The user identifier may be the same as the user identifier used for linking the radio connection to be resumed to the maintained control and user plane connections or it may be a temporary one established for the radio connection resume. The authentication token may be created (and informed to the user device) by a serving node in relation to the user device entering into the low activity state. The serving (access/network) node prepares the context information and transmits the network context information to the node the user device selected which node may then respond with an acknowledgement (ACK/NAK) message. The selected node (access/network node) transmits a radio connection resume complete or other response message to the user device and the user device carries out a radio connection resume (or establishment) procedure after which the user device has a radio link connection to the network.

It should be understood that connections (S1*-u/S1*-c, for example) to a core network are maintained while the user device is in a low activity state.

FIG. 5B shows an example, wherein a user device (UE) transmits a request for the preparation of a network context for data transmission. A user device determines a need for data transmission or a need to update a network context, due to a cell change, for example, and starts listening to broadcast channels of access nodes (one shown, AP) nearby for cell selection. Broadcast info typically comprises public land mobile network (PLMN) identity, tracking area code, cell identity, etc. Typically, a user device selects a suitable cell based on radio measurements made to a broadcast signal each node is transmitting. The quality of a radio channel is an important factor in cell selection. The user device may be configured to carry out radio measurements in a low activity state.

A random access procedure, such as a RACH procedure of the LTE, may be carried out for obtaining resources for transmitting request for the preparation of a network context for data transmission (context preparation request in the Figure). The user device transmits the request to the selected access node/network node (AP).

If the network node is not the node operating as the serving node, it transmits a network context (preparation) request to the node operating as the serving node. A serving node stores user device's network context during the low activity state. The serving node may be the last serving node of the user device while it was in an active or connected state that is to say before entering into a low activity state or the responsibility for storing the network context may be transferred to another node, for example based on a cell change carried out by a user device while it is in a low activity state.

The serving node verifies the user device with authentication information associated with the network context. Authentication information may comprise a user identifier and an authentication token. The user identifier may be the same as the user identifier used for linking the radio connection to be resumed to the maintained control and user plane connections or it may be a temporary one established for the radio connection resume. The authentication token may be created (and informed to the user device) by a serving node in relation to the user device entering into the low activity state. The serving (access/network) node prepares the context information and transmits the network context information to the node the user device selected which node may then respond with an acknowledgement (ACK/NAK) message. The context (preparation) response may comprise (updated) security information.

The user device may carry out a similar radio connection resume procedure than that presented in FIG. 5A with the exception that context information preparation/transfer has already been taken care of. Therefore the radio connection resume procedure may be carried out locally between the selected (access/network) node and the user device (radio connection resume request, radio connection resume complete). The radio connection resume procedure may be carried out as a continuation for the context preparation, or, if the context preparation has been started due to a cell change or another corresponding reason without an immediate need for data transmission, the user device may carry out the radio connection resume procedure only, if a need for data transmission is later determined. It is possible that the user device carries out a new cell change and does not use the updated network context, but repeats the network context preparation in a new cell. The network context may be node-specific, cell-specific or tracking area specific, thus the network context may be valid for one cell, a plurality of cells provided by the same (access, network) node or a plurality of cells provided by different nodes.

FIG. 5C shows an example, wherein a user device (UE) is in a low activity state and it has changed its location while being in the low activity state and it is now under the coverage area of access node AP.

The access node AP determines that is does not have a network context of the user device and transmits a network context request on its own initiative to a node which served the user device (stores the user device's network context) when the user device entered into the low activity state. The node in the area of which the user device is located is aware of the user device's location based on a location update the user device carries out with regard to a cell change, for example. The location update or location information comprises information on the identity of the node storing the user device's network context.

The serving AP verifies the user device with authentication information associated with the network context. Authentication information may comprise a user identifier and an authentication token. The user identifier may be the same as the user identifier used for linking the radio connection to be resumed to the maintained control and user plane connections or it may be a temporary one established for the radio connection resume. The authentication token may be created (and informed to the user device) by a serving node in relation to the user device entering into the low activity state.

The serving AP prepares the network context. The network context may be node-specific or cell-specific. It is also possible, for example in the case where there are a plenty of small cells in the area, that one node takes care of the network context preparation for a plurality of nodes in which case the network connection may be tracking area-specific or cell group-specific (for example valid for small cells under the same macro cell).

The node receives the network context (context preparation response) and stores it for possible later use. The node may transmit a context acknowledgement message.

If the user device determines a need for a data transmission, it may carry out a similar radio connection resume procedure than that presented in FIG. 5A with the exception that context information preparation/transfer has already been taken care of. Therefore the radio connection resume procedure may be carried out locally between the selected (access/network) node and the user device (radio connection resume request, radio connection resume complete). Radio resources may be obtained by a random access procedure (broadcast info, random access).

It should be appreciated that transmitting, receiving, etc. may in this application mean preparing a transmission (such as preparing data for a transmission), controlling or causing a transmission or reception, or carrying out a physical transmission or reception (via radio parts or a remote radio head, for example) depending on the application.

An embodiment provides an apparatus which may be a user device or any other suitable apparatus capable to carry out processes described above in relation to FIG. 4.

It should be appreciated that the apparatus may include or otherwise be in communication with a control unit, one or more processors or other entities capable of carrying out operations according to the embodiments described by means of FIG. 4. It should be understood that each block of the flowchart of FIG. 4 and any combination thereof may be implemented by various means or their combinations, such as hardware, software, firmware, one or more processors and/or circuitry.

FIG. 6 illustrates a simplified block diagram of an apparatus according to an embodiment in relation to FIG. 4.

As an example of an apparatus according to an embodiment, it is shown apparatus 600, such as a user device, including facilities in control unit or circuit/circuitry 604 (including one or more processors, for example) to carry out functions of embodiments according to FIG. 4. The facilities may be software, hardware or combinations thereof as described in further detail below.

In FIG. 6, block 606 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 600 may include at least one processor 604 and at least one memory 602 including a computer program code, the at least one memory and the computer program code configured to, with the at least one processor, cause the apparatus at least to: select a cell in a low activity state; in the case the selected cell is the same as a serving cell while carrying out a state change to the low activity state, transmit a radio connection resume request to the selected cell; in the case the selected cell is another cell than the serving cell while carrying out a state change to the low activity state, transmit a radio connection resume request to the selected cell with information on the location of the user device provided the information on the location has not been transmitted in relation to a cell change carried out in the low activity state; receive, as a response to the radio connection resume request, a radio connection resume request response, and carry out a radio connection resume for the data transmission. It should be understood that the apparatus may include or be coupled to other units or modules etc., such as radio parts or radio heads, used in or for transmission and/or reception. This is depicted in FIG. 6 as optional block 606.

Yet another example of an apparatus comprises means (604) for selecting a cell in a low activity state, and, in the case the selected cell is the same as a serving cell while carrying out a state change to the low activity state, means (604, 606) for transmitting a radio connection resume request to the selected cell; or, in the case the selected cell is another cell than the serving cell while carrying out a state change to the low activity state, means (604, 606) for transmitting a radio connection resume request to the selected cell with information on the location of the user device provided the information on the location has not been transmitted in relation to a cell change carried out in the low activity state; means (604, 606) for receiving, as a response to the radio connection resume request, a radio connection resume request response, and means (604, 606) for carrying out a radio connection resume for the data transmission.

It should be understood that the apparatus may include or be coupled to other units or modules etc., such as radio parts or radio heads, used in or for transmission and/or reception. This is depicted in FIG. 6 as optional block 606. The apparatus may also include or be coupled to a communications interface.

Although the apparatuses have been depicted as one entity in FIG. 6, different modules and memory may be implemented in one or more physical or logical entities.

An embodiment provides an apparatus which may be a node (network node, access node), server, host or any other suitable apparatus capable to carry out processes described above in relation to FIGS. 2 and/or 3. The apparatus is suitable for operating as a node storing the network context information of a user device or any other node providing radio services to the user device.

It should be appreciated that the apparatus may include or otherwise be in communication with a control unit, one or more processors or other entities capable of carrying out operations according to the embodiments described by means of FIGS. 2 and/or 3. It should be understood that each block of the flowchart of FIGS. 2 and/or 3 and any combination thereof may be implemented by various means or their combinations, such as hardware, software, firmware, one or more processors and/or circuitry.

FIG. 7 illustrates a simplified block diagram of an apparatus according to an embodiment in relation to FIGS. 2 and/or 3.

As an example of an apparatus according to an embodiment, it is shown apparatus 700, such as a user device, including facilities in control unit or circuit/circuitry 704 (including one or more processors, for example) to carry out functions of embodiments according to FIGS. 2 and/or 3. The facilities may be software, hardware or combinations thereof as described in further detail below.

In FIG. 7, block 706 includes parts/units/modules needed for reception and transmission, usually called a radio front end, RF-parts, radio parts, remote radio head, etc. The parts/units/modules needed for reception and transmission may be comprised in the apparatus or they may be located outside the apparatus the apparatus being operationally coupled to them. The apparatus may also include or be coupled to one or more internal or external memory units.

Another example of apparatus 700 may include at least one processor 704 and at least one memory 702 including a computer program code, the at least one memory and the computer program code configured to, with the at least one processor, cause the apparatus at least to: receive, by a network node, a radio connection resume request or a request for preparation of a network context from a user device, the radio connection resume request or the request for the preparation of the network context comprising information on a node operating as a serving node for the user device; in the case the network node is not the node operating as the serving node, transmit a network context request for a network context information of the user device to the node operating as the serving node and receive the network context information, and transmit a response to the radio connection resume request or to the request for preparation of a network context to the user device, the response to the radio connection resume request or to the request for preparation of a network context comprising information needed for data transmission; or transmit the network context request for the network context information of the user device, receive and store the network context information while the user device is in a low activity state; and/or the at least one memory and the computer program code configured to, with the at least one processor, cause the apparatus at least to: receive, by a node storing a network context information of a user device, a radio connection resume request from the user device; verify the user device with authentication information associated with the network context information, and transmit a response to the radio connection resume request to the user device, the response comprising information needed for data transmission; or receive, by the node storing the network context information of the user device, a network context request for the network context information of the user device from a requesting node; verify the user device with the authentication information associated with the network context information, and transmit the network context information to the requesting node the network context information comprising security information for data transmission.

It should be understood that the apparatus may include or be coupled to other units or modules etc., such as radio parts or radio heads, used in or for transmission and/or reception. This is depicted in FIG. 7 as optional block 706.

Yet another example of an apparatus comprises means (704, 706) for receiving, by a network node, a radio connection resume request or a request for preparation of a network context from a user device, the radio connection resume request or the request for the preparation of the network context comprising information on a node operating as a serving node for the user device, and, in the case the network node is not the node operating as the serving node, transmitting a network context request for a network context information of the user device to the node operating as the serving node and receiving the network context information, and transmitting a response to the radio connection resume request or to the request for preparation of a network context to the user device, the response to the radio connection resume request or to the request for preparation of a network context comprising information needed for data transmission; or means (704, 706) for transmitting the network context request for the network context information of the user device, receiving and storing the network context information while the user device is in a low activity state; and/or means (704, 706) for receiving, by a node storing a network context information of a user device, a radio connection resume request from the user device, means (704) for verifying the user device with authentication information associated with the network context information, and means (704, 706) for transmitting a response to the radio connection resume request to the user device, the response comprising information needed for data transmission; or means (704, 706) for receiving, by the node storing the network context information of the user device, a network context request for the network context information of the user device from a requesting node; means (704) for verifying the user device with the authentication information associated with the network context information, and means (704, 706) for transmitting the network context information to the requesting node the network context information comprising security information for data transmission.

It should be understood that the apparatus may include or be coupled to other units or modules etc., such as radio parts or radio heads, used in or for transmission and/or reception. This is depicted in FIG. 7 as optional block 706.

Although the apparatuses have been depicted as one entity in FIG. 7, different modules and memory may be implemented in one or more physical or logical entities.

An apparatus may in general include at least one processor, controller, unit, module or (electronic) circuitry designed for carrying out functions of embodiments operationally coupled to at least one memory unit (or service) and to typically various interfaces. A circuitry may refer to hardware-only circuit implementations, such as implementations in only analog and/or digital circuitry, combinations of circuits and software (and/or firmware), such as different kind of processors of portions of them, software and/or circuit components, such as a microprocessor(s) or a portion of a microprocessor(s). Further, the memory units may include volatile and/or non-volatile memory. The memory unit may store computer program code and/or operating systems, information, data, content or the like for the processor to perform operations according to embodiments described above in relation to FIGS. 2, 3, 4 and/or 5. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be an electronic circuit or a system of electronic circuits performing a particular function in an electronic device with a computer program code. The electronic circuit may comprise at least one processor and additionally at least one internal or external memory. It should be understood that the term circuit/circuitry or electronic circuit may refer to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of circuit/circuitry applies to all uses of this term in this application.

The apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be loaded to the apparatus. A computer program product may comprise one or more computer-executable components which, when the program is run, for example by one or more processors possibly also utilizing an internal or external memory, are configured to carry out any of the embodiments or combinations thereof described above by means of FIGS. 2, 3, 4 and/or 5A-5C.

The one or more computer-executable components may be at least one software code or portions thereof. Computer programs may be coded by a programming language or a low-level programming language.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims

The invention claimed is:

1. An apparatus comprising:
at least one processor and at least one memory including a computer program code, the at least one memory and the computer program code configured to, with the at least one processor, cause the apparatus at least to:
receive, by a network node that is not a serving node for a user device, a request for preparation of a network context from the user device, the request for the preparation of the network context comprising information on a node operating as a serving node for the user device;
transmit, by the network node, a network context request for a network context information of the user device to the node operating as the serving node and receive the network context information from the node operating as the serving node;
transmit, by the network node, a response to the request for preparation of a network context to the user device, the response to the request for preparation of a network context comprising information needed for data transmission;
receive, by the network node, a radio connection resume request, from the user device; and
receive, by the network node, data from the user device, wherein data is received using the information needed for data transmission.

2. The apparatus of claim 1, further comprising causing the apparatus to transmit, as a response to the receiving the network context of the user device, a confirmation message.

3. The apparatus of claim 1, wherein the information needed for data transmission comprises security information and/or the response to the request for preparation of a network context comprises the security information.

4. The apparatus of claim 1, further comprising causing the apparatus to carry out a serving node change and store the network context of the user device for operating as a new serving node for the user device.

5. The apparatus of claim 4, further comprising causing the apparatus to update security information with the assistance of a core network and wherein the updated security information is transmitted to the user device as a part of the information needed for the data transmission or with the response to the request for preparation of a network context.

6. An apparatus comprising:
at least one processor and at least one memory including a computer program code, the at least one memory and the computer program code configured to, with the at least one processor, cause the apparatus at least to:
transmit, by a user device, a request for preparation of a network context from a network node that is not a serving node for the user device, the preparation of the network context comprising information on a node operating as a serving node for the user device;
receive, at the user device, a response to the request for preparation of a network context from the network node that is not the serving node for the user device, the response to the request for preparation of a network context comprising information needed for data transmission;
transmit, by the user device, a radio connection resume request, to the network node; and
transmit, by the user device, data to the network node, wherein data is transmitted using the information needed for data transmission.

7. The apparatus of claim 6, wherein the information needed for data transmission comprises security information for data transmission.

8. The apparatus of claim 7, wherein the security information is in relation to a network context.

9. The apparatus of claim 6, wherein the information needed for data transmission comprises at least one of the following: an authentication token created in relation to the user device entering into the low activity state, a user identification, information on the serving cell and a resume cause.

10. The apparatus of claim 6, further comprising causing the apparatus to:
in the case the selected cell is another cell than the serving cell while carrying out a state change to the low activity state, prior to transmitting the radio connection resume request to the selected cell:
transmit the request for preparation of a network context to the selected cell, and
receive the response to the request for preparation of a network context, the response comprising security information for data transmission.

11. A method comprising:
receiving, by a network node that is not a serving node for a user device, a request for preparation of a network context from the user device, the request for the preparation of the network context comprising information on a node operating as a serving node for the user device;
transmitting, by a network node, a network context request for a network context information of the user device to the node operating as the serving node and receiving the network context information from the node operating as the serving node;
transmitting, by a network node, a response to the request for preparation of a network context to the user device, the response to the request for preparation of a network context comprising information needed for data transmission;
receiving, by the network node, a radio connection resume request, from the user device; and
receiving, by the network node, data from the user device, wherein data is received using the information needed for data transmission.

12. A method comprising:
transmitting, by a user device, a request for preparation of a network context from a network node that is not a serving node for the user device, the preparation of the network context comprising information on a node operating as a serving node for the user device;
receiving, at the user device, a response to the request for preparation of a network context from the network node, the response to the request for preparation of a network context comprising information needed for data transmission;
transmitting, by the user device, a radio connection resume request, to the network node; and
transmitting, by the user device, data to the network node, wherein data is transmitted using the information needed for data transmission.

* * * * *